United States Patent [19]

Hooper, Jr.

[11] 4,101,765

[45] Jul. 18, 1978

[54] MEANS FOR COUNTERACTING CHARGED PARTICLE BEAM DIVERGENCE

[75] Inventor: Edwin B. Hooper, Jr., Danville, Calif.

[73] Assignee: The United States of America as represented by the United States Department of Energy, Washington, D.C.

[21] Appl. No.: 706,402

[22] Filed: Jul. 19, 1976

[51] Int. Cl.[2] .................................... G01N 27/78

[52] U.S. Cl. .................................... 250/251

[58] Field of Search ................ 250/396, 396 ML, 251, 250/292, 311

[56] References Cited

U.S. PATENT DOCUMENTS 3,197,680 7/1965 Wingerson .......................... 250/396

3,723,741 3/1973 Ehrenstein .......................... 250/251

FOREIGN PATENT DOCUMENTS 1,304,893 1/1973 United Kingdom ......... 250/396 ML

*Primary Examiner*—Alfred E. Smith

*Assistant Examiner*—B. Anderson

*Attorney, Agent, or Firm*—Dean E. Carlson; Roger S. Gaither; L. E. Carnahan

[57] ABSTRACT

To counteract charge particle beam divergence, magnetic field-generating means are positioned along the edges of a charged particle beam to be controlled, such as to deflect and redirect particles tending to diverge from a desired beam direction. By selective arrangement of the magnetic field-generating means, the entire beam may be deflected and guided into different directions.

7 Claims, 5 Drawing Figures

MEANS FOR COUNTERACTING CHARGED PARTICLE BEAM DIVERGENCE

BACKGROUND OF THE INVENTION

The invention described herein was made in the course of, or under, Contract No. W-7405-ENG-48, with the Energy Research and Development Administration.

The invention relates to the transport of ion beams, particularly to the transport of low energy charged particle beams, and more particularly to means for counteracting divergence of such charged particle beams.

The transport of ion beams for generating neutral beams used in a controlled thermonuclear reactor (CTR) is limited by the finite transverse temperature of the beam, usually 1–5 eV. For high energy beams the resulting divergence is small and offers little problem. However, for low energy beams ($<10$ keV) the divergence can be significant and may limit current density in long beam lines.

The above-mentioned problem is critical, for example, in the double charge exchange method of producing negative hydrogen and deuterium ions wherein a low energy beam (say 1 keV $D^+$) is passed through a charge exchange cell (say cesium), and a fraction converted into $D^-$. It is important that the $D_2$ gas pressure in the cesium cell be low enough that stripping collisions not significantly reduce the negative ion fraction. It is also important not to get much cesium in the positive ion source or in a high voltage post accelerator associated therewith. As a consequence, it is desirable to have an appreciable distance ($\sim 1$ meter) between the charge-exchange cell and other components. At a half-angle divergence of 0.1 radian, typical of a low energy beam, the beam will spread by 20 cm, with the resulting lower current density. Furthermore, the beam entering a high voltage post-accelerator will be nonuniform, with the consequential difficulties of acceleration. It is highly desirable, therefore, to obtain means of transporting the beam without distorting phase space.

The use of electric fields and solenoidal magnetic fields have been considered as a solution to the above problem. However, electric fields would cause electrical discharge problems in the background plasma formed by the beam. The solenoidal magnetic field is undesirable for two reasons: the beam trajectories are seriously distorted in the entrance and exit regions, and the background plasma would become unstable, with the resulting electric fields increasing the beam divergence.

SUMMARY OF THE INVENTION

The present invention provides a solution to the above-described problem by generating magnetic fields along the edge of the beam which will affect particle trajectories only near the beam edge and, thus, provide for transporting the beam without serious increase in beam divergence. Such magnetic fields can be generated by an "open" system so as to permit pumping of gas from the beam line.

Therefore, it is an object of the invention to provide means for counteracting charged particle beam divergence.

A further object of the invention is to provide means for substantially reducing the divergence of low energy beams during transport thereof.

Another object of the invention is to provide means for controlling the divergence of low energy beams by use of magnetic fields along the edge of the beam.

Another object of the invention is to provide means for counteracting charged particle beam divergence by utilizing means for generating magnetic fields along the edge of the beam such as to deflect beam particles tending to diverge from a desired beam direction.

Other objects of the invention will become readily apparent to one skilled in the art from the following description and accompanying drawings.

DESCRIPTION OF THE INVENTION

The invention is directed to means for counteracting charged particle beam divergence, and is particularly applicable to the transport of low energy beam.

A directed beam of charged particles will diverge as the particles acquire a transverse velocity component. Although beam divergence may be relatively small for high energy beams, for low energy beams the divergence is significant and limits the distance over which such beams can be transported without substantial loss of current density.

Figure 1:
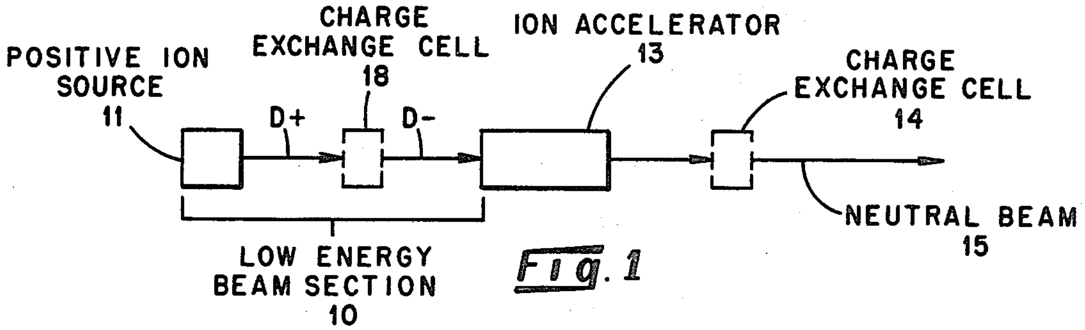
FIG. 1 schematically illustrates an embodiment of a neutral beam-generating system to which the invention is applicable.

As an example of the troublesome nature of beam divergence, consider the neutral beam-generating system shown in FIG. 1 which basically comprises a double charge exchange method of producing negative hydrogen and deuterium ions, as discussed above. FIG. 1 comprises a low energy beam section, indicated generally at 10, (composed of a positive ion source 11 and a charge exchange cell 12), an ion accelerator 13, and a charge exchange cell 14, producing a neutral beam 15. Both the positive ion source 11 and the charge exchange cell 12 in the low energy ion beam section 10 produce unwanted gases (mostly neutral deuterium and cesium) in the system. Removal of these gases requires considerable spacing of the ion source 11, the charge exchange cell 12, and the ion beam accelerator 13. As a result, the total length of the low energy ion beam section becomes quite large. For a typical 1-meter low energy ion beam length and a half-angle divergence of 0.1 radians, the ion beams will diverge or spread by 20 cm. Such amount of beam divergence is undesirable, since it substantially decreases the beam current density and introduces beam nonuniformities at the input of the ion beam accelerator, as pointed out above.

Briefly, the invention involves employing magnetic field-generating means along the edges of a charge particle beam to be controlled, such as to deflect and redirect particles tending to diverge from a desired beam direction.

Figure 2:
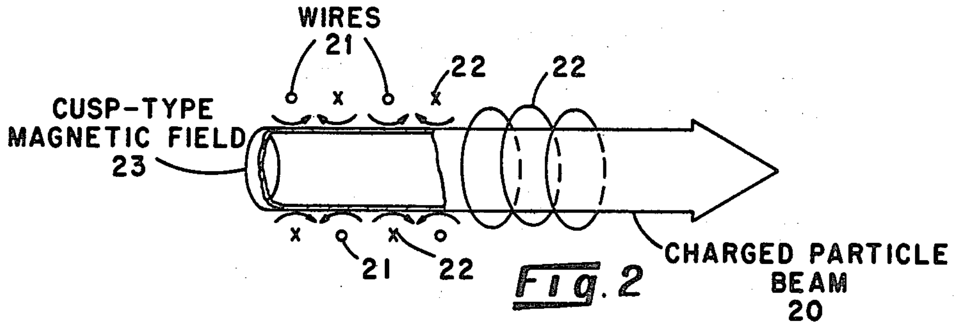
FIG. 2 illustrates an embodiment of the invention.

Consider a charged particle beam traveling in the $z$-direction but with a finite divergence in the $x$-direction. The problem is thus two-dimensional; the cylindrically symmetric case could be handled in a similar way. Wire loops are positioned along the $y$-direction (see FIG. 2). Currents flow in alternating directons in these wire loops resulting in a cusp magnetic field; in advanced versions, permanent magnets might be used. As shown in FIG. 2, which schematically illustrates an embodiment of the magnetic field-generating means of the invention, comprises a charged particle beam 20 having sets or pairs of parallel electrically conductive wires or members (e.g., sets of parallel loops) 21 and 22 positioned around beam 20 and arranged in spaced relation along the edges of the beam and carrying currents flowing in alternating directions as indicated by the current direction symbols, such as to produce a cusp-type magnetic field configuration 23 shown by the curved arrows. The current in wire loops 21 and 22 is supplied by a source, not shown, such as a low voltage power supply. A charged particle diverging from the beam direction and approaching the wires along the beams's edges experiences a force which deflects the particle back into the beam as described in greater detail hereinafter.

A particle approaches the wires in a glancing collision, and thus experiences an alternating magnetic field with amplitude slowly increasing in time. If the field becomes strong enough, the particle will reverse its $x$-direction and return towards the axis. The effect can be considered either as a reflection from a region of high magnetic pressure or as a second order effect in which the $v_xB_z$ force generates $v_y$ which then interacts with $B_z$ to reverse $v_x$. The $V_zB_x$ forces alternate rapidly in time as the particle passes many wires, and thus average to zero.

The particle equations of motion are:

$$m\frac{dv_x}{dt} = q\, v_yB_z/C = \frac{qv_y}{C}\,\frac{\delta A}{\delta x} \quad (1a)$$

$$m\frac{dv_y}{dt} = \frac{q}{C}(v_zB_x - v_xB_z) = \frac{-q}{C}\left(v_z\frac{\delta A}{\delta x} + v_x\frac{\delta A}{\delta z}\right) \quad (1b)$$

$$m\frac{dv_z}{dt} = \frac{-q}{C}\,v_yB_x = \frac{qv_y}{C}\,\frac{\delta A}{\delta z} \quad (1c)$$

with A the $y$-component of the vector potential. The $y$-component of canonical angular momentum is conserved:

$$v_y + qA/mC = \text{const.} \equiv v_o \quad (2)$$

so that, with $v_y$ taken as the function of x, z:

$$\frac{dv_x}{dt} = -\frac{1}{2}\,\frac{\delta v_y^2}{\delta x} \quad (3a)$$

$$\frac{dv_z}{dt} = -\frac{1}{2}\,\frac{\delta v_y^2}{\delta z} \quad (3b)$$

The vector potential is given by $$A = \frac{I}{10}\sum_{n=-\infty}^{\infty}(-1)^n\{\ln[(x-x_o)^2+(z-nl)^2] - \ln[(x+x_o)^2+(z-nl)^2]\} \quad (4)$$

-continued $$= \frac{I}{10}\left\{\ln\left[\frac{\cosh\frac{\pi(x-x_o)}{l}+\cos\frac{\pi z}{l}}{\cosh\frac{\pi(x-x_o)}{l}-\cos\frac{\pi z}{l}}\right] - ln\left[\frac{\cosh\frac{\pi(x+x_o)}{l}+\cos\frac{\pi z}{l}}{\cosh\frac{\pi(x-x_o)}{l}-\cos\frac{\pi z}{l}}\right]\right\}$$

where the wires are in the planes $x = \pm x_o$ and spaced by a distance $l$. The current is in amps and the magnetic field in gauss if distances are centimeters.

For the case of grazing incidence, Rowlands has solved Eq. (3*a*) by means of an average over $z$. He finds that under appropriate conditions, the sign of $v_x$ reverses during the interaction, with little exchange of energy between $x$ and $z$ motion. This result is verified by computer calculations described below.

Figure 3:
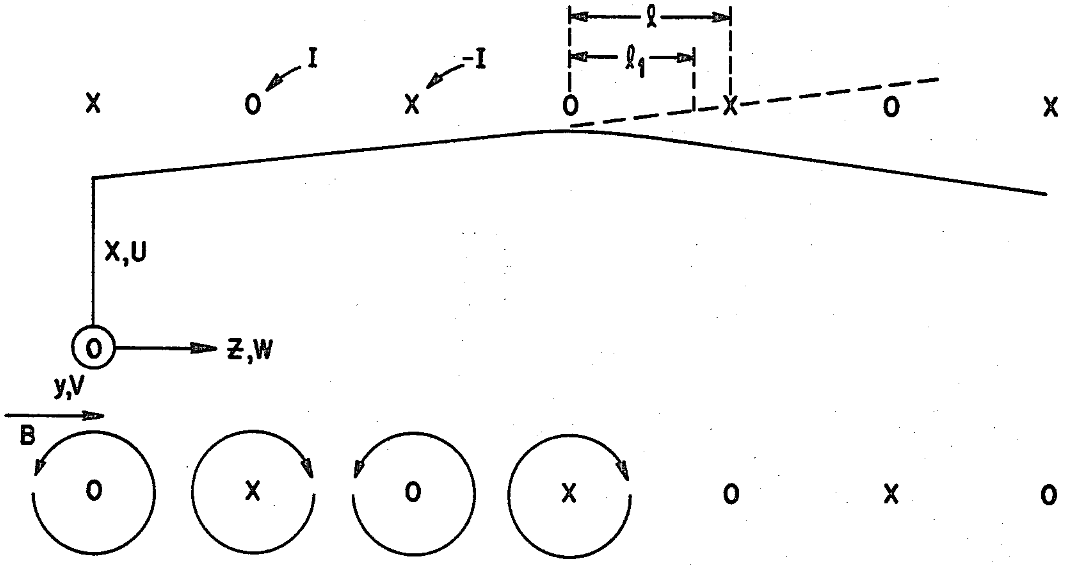
FIG. 3 diagrammatically and mathematically illustrates a beam particle passing through the magnetic field-generating means of the FIG. 2 embodiment.

The final $v_x$ (after interaction with the wires) can be described as equal to the initial $v_x$ times a function of the dimensionless parameters of the system as described in FIG. 3. We can, in fact, eliminate most of these parameters by physical arguments:

(a) For grazing incidence the interaction should be independent of the exact value of $v_z^i$. It should also be independent of the initial component $v_y$ (parallel to the wires) which will only cause a modulation of the velocity during the interaction phase.

(b) For grazing incidence the interaction with the wires should be independent of $l_1$, the actual extrapolated point of intersection of the unperturbed orbit with the plane of the wires. As all other distance parameters, except $l$, are equivalent to $l_1$, we conclude that $v_x^f$ should be independent of $l$.

Thus, $$v_x^f = v_x^i f\left[0 = \frac{v_x^i}{v_x^i}, \frac{Mv_x^i}{qI}, \frac{v_y^i}{v_z^i}, \frac{l_1}{l}\right] \quad (5)$$

and, $$v_x^f \approx v_x^i f\left(\frac{Mv_x^i}{qI}\right) \quad (5a)$$

Figure 4:
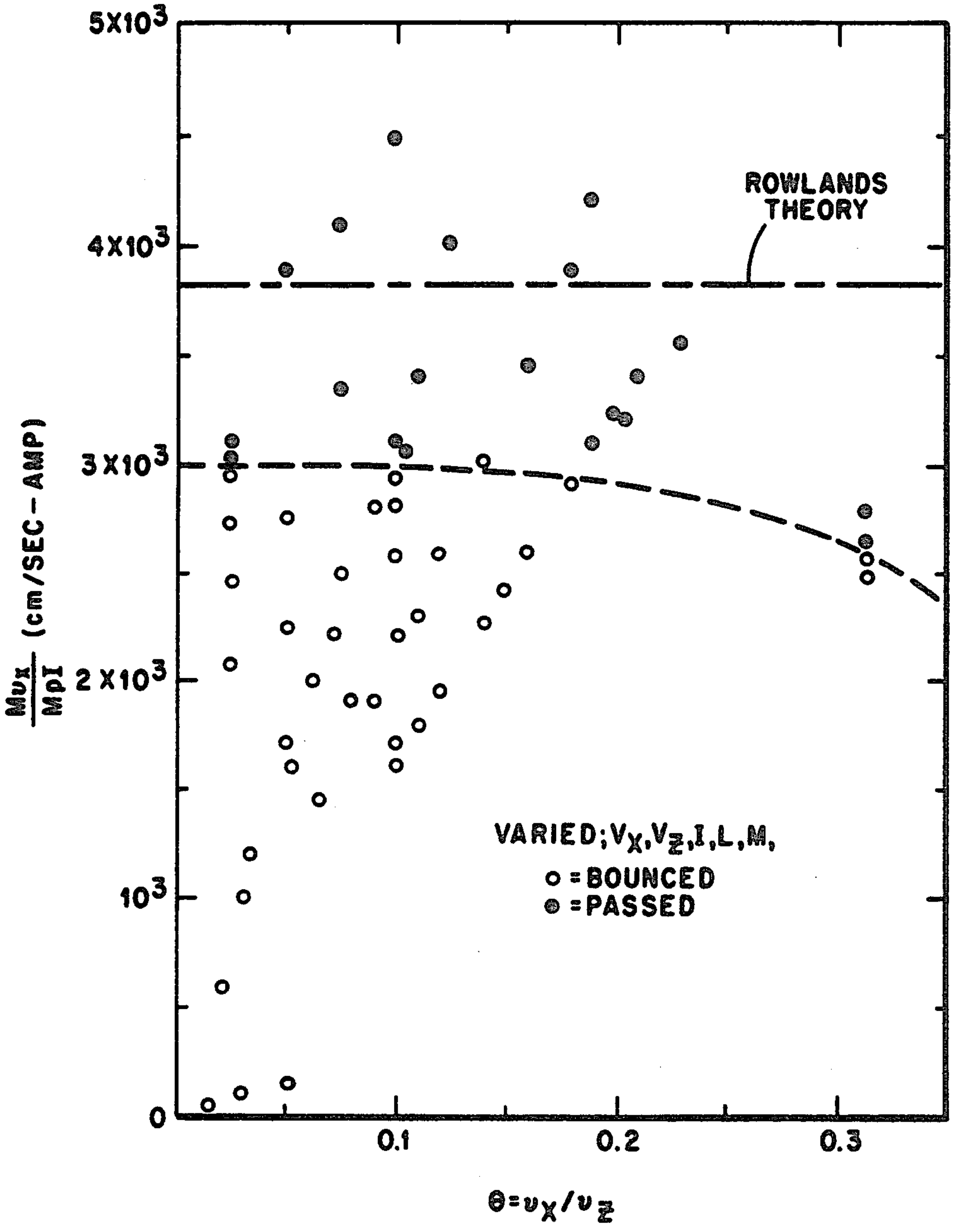
FIG. 4 graphically summarizes tests made to determine the conditions for reflection.

A series of runs were made to determine the conditions for reflection. The results are summarized in FIG. 4 ($M_p$ = proton mass). Also included is Rowland's theory. We see that the calculations show that Eq. (5*a*) is a good approximation and that the theory is valid to within about 25%.

The cusp field, formed by the FIG. 2 apparatus, looks almost like a mirror to particles with perpendicular moments below the "leakage" value. It thus does not distort phase space; instead the input is effectively transformed to the output. Further, the cusp transporter or field operates on a second order effect and is thus independent of charge, and as a result it can be used in a charge exchange cell where the beam is changing the sign of its charge. However, since it is presumably desirable to minimize the plasma density in the beam duct, the cusp field device is less successful in containing plasma due to the null transverse field regions between the wires. The currents in adjacent wires of the FIG. 2 device are opposite in the cusp and therefore the device is stable to motion of the wires towards one another.

By way of example, for a low energy charged particle beam (1 keV) having a diameter of 10 cm and being transported over a distance of 100 cm, the wire loops 21 and 22, in FIG. 2, would be constructed of copper having a wire diameter of 0.5 cm and loop diameter of 11 cm so as to define a space of about 0.25 cm between the inner surface of the wire loops and the outer edge of the beam. The wire loops are spaced a distance *l* of 2 cm from one another along the entire length of the beam. Current flowing in each loop is 1000 amps and the magnetic field produced is 800 gauss. With the above exemplified parameter, approximately 75% of the beam divergence will be controlled or redirected along the beam, whereby the low energy beam can be transported into the accelerator with only a current density loss of about 25% as well as substantially maintaining uniformity of the beam at the input of the accelerator.

Figure 5:
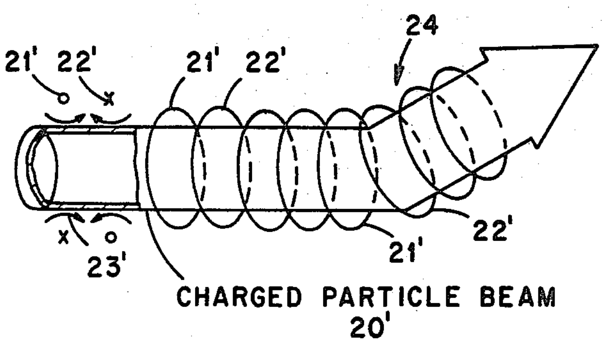
FIG. 5 illustrates an embodiment of the invention for deflecting and guiding the entire beam into different directions.

FIG. 5 illustrates an embodiment similar to that of FIG. 2 except that the magnetic field-producing wire loops 21' and 22' are positioned along one section of charged particle beam 20' so as to deflect and guide the beam into a different direction. To accomplish this, for example, with the beam, wire loop, current, and magnetic field parameters exemplified above, the pair or set of wire loops in the curved beam section indicated at 24 are spaced at an angle with respect to one another, such as 1° so that the space between the loops at the bottom is about 2.2 cm with about 2 cm between same at the top, whereby the beam 20' is curved at an angle of about 1° per wire.

It has thus been shown that the present invention provides a magnetic field-generating means arranged along the edges of a charged particle beam carrying currents, such as to produce a cusp-type magnetic field configuration, which functions to counteract particles diverging from the beam such that these particles experience a force which deflects them back into the beam. Thus, the present invention provides a relatively simple and effective means whereby low energy beams can be transported without substantial loss of current density.

While particular embodiments and parameters of the invention have been illustrated and/or described, modifications and changes will become apparent to those skilled in the art, and it is intended to cover in the appended claims all such modifications and changes as come within the spirit and scope of the invention.

What I claim is:

1. In combination with a neutral beam-generating system composed of a low energy beam section, an ion accelerator aligned to receive a beam from said low energy beam section, and a charge exchange cell aligned to receive the output from said accelerator; apparatus for counteracting charged particle beam divergence comprising means for forming a cusp-type magnetic field positioned about an associated neutral beam, said magnetic field forming means being positioned in said low energy beam section of said neutral beam-generating system for deflecting and redirecting particles tending to diverge from a desired beam direction.

2. The apparatus defined in claim 1, wherein said means comprises a plurality of sets of electrically conductive members positioned in axially aligned, spaced relationship, each of said members carrying electrical current in alternating directions.

3. The apparatus defined in claim 2, wherein said sets of electrically conductive members each comprise a pair of spaced parallel wire loops.

4. The apparatus defined in claim 2, wherein at least one set of said electrically conductive members are positioned such that one of said members is at an angle with the other of said members, whereby causing a change in direction of an associated beam.

5. The combination defined in claim 1, wherein said low energy beam section is composed of a positive ion source and a charge exchange cell.

6. A method for preventing substantial loss of current density of a charged particle beam in neutral beam-generating systems due to divergence of the particles caused by a transverse velocity component comprising the step of generating magnetic fields along the edges of the charged particle beam such as to deflect beam particles tending to diverge from a desired beam direction by positioning a plurality of spaced substantially parallel electrically conductive loops along the longitudinal length of the beam, and passing electric current through the loops in a direction opposite the direction of current flow in an adjacent loop creating cusp-type magnetic fields about the charged particle beam.

7. The method defined in claim 6, additionally including the steps of positioning at least one of the loops at an angle with respect to at least one other loop causing a change in direction of the beam.

* * * * *